United States Patent
Pai

(10) Patent No.: US 11,213,118 B2
(45) Date of Patent: Jan. 4, 2022

(54) METHODS AND DEVICES FOR PERSONALIZED DENTAL CARE

(71) Applicant: ZeroBrush Inc., Palo Alto, CA (US)

(72) Inventor: Nidhi Pai, Palo Alto, CA (US)

(73) Assignee: ZeroBrush, Inc., Palo Alto, CA (US)

( * ) Notice: Subject to any disclaimer, the term of this patent is extended or adjusted under 35 U.S.C. 154(b) by 807 days.

(21) Appl. No.: 14/939,909

(22) Filed: Nov. 12, 2015

(65) Prior Publication Data

US 2016/0135581 A1 May 19, 2016

Related U.S. Application Data

(60) Provisional application No. 62/078,134, filed on Nov. 11, 2014.

(51) Int. Cl.
| | | |
|---|---|---|
| *A46B 9/04* | (2006.01) | |
| *A46B 5/00* | (2006.01) | |
| *A61C 17/22* | (2006.01) | |
| *A61C 17/34* | (2006.01) | |

(52) U.S. Cl.
CPC ............ *A46B 9/045* (2013.01); *A46B 5/0095* (2013.01); *A61C 17/222* (2013.01); *A61C 17/3481* (2013.01); *A61C 17/228* (2013.01)

(58) Field of Classification Search
CPC ... A46B 9/045; A46B 17/3481; A46B 17/228; A46B 17/22; A46B 17/222
See application file for complete search history.

(56) References Cited

U.S. PATENT DOCUMENTS

| | | | | |
|---|---|---|---|---|
| 3,769,652 A | * | 11/1973 | Rainer | A46B 9/045 15/167.2 |
| 3,874,084 A | * | 4/1975 | Cole | A61C 17/00 433/141 |
| 4,011,616 A | * | 3/1977 | Kennedy | A46B 9/045 15/21.1 |
| 4,237,574 A | * | 12/1980 | Kelly | A46B 9/045 15/167.2 |
| 6,353,956 B1 | | 3/2002 | Berge | |

(Continued)

FOREIGN PATENT DOCUMENTS

| | | | | | |
|---|---|---|---|---|---|
| WO | WO 2008/016342 A1 | * | 2/2008 | ............ | A46B 9/045 |
| WO | WO 2012/085799 A1 | * | 6/2012 | ............ | A46B 9/045 |

OTHER PUBLICATIONS www.blizzident.com/how-it-works.html, "How it Works", Blizzident, published 2013. (Year: 2013).*

*Primary Examiner* — Laura C Guidotti
(74) *Attorney, Agent, or Firm* — Morgan, Lewis & Bockius LLP

(57) ABSTRACT

A toothbrush device comprises a cleaner body that defines a cleaning cavity configured for receiving a set of teeth of a user. A powered driving mechanism is coupled to the cleaner body and is configured to impart driven movement to the cleaner body, thereby to effect cleaning of a set of teeth engaged with the cleaning cavity. The cleaner body can be uniquely customized for a specific user, the cleaning cavity being substantially complementary in shape only to the corresponding set of teeth of the specific user. Cleaning elements can be arranged non-uniformly in the cleaning cavity to define focus areas corresponding to identified dental problem areas unique to the specific user.

19 Claims, 9 Drawing Sheets

(56) References Cited

U.S. PATENT DOCUMENTS

| | | | |
|---|---|---|---|
| 8,631,531 B2 * | 1/2014 | Garner | A61C 17/228 |
| | | | 15/22.1 |
| 8,745,802 B2 | 6/2014 | Steur | |
| 8,856,997 B2 | 10/2014 | Moll | |
| 9,204,713 B2 | 12/2015 | Miller | |
| 2004/0074035 A1 | 4/2004 | Huang | |
| 2005/0196725 A1 | 9/2005 | Fu | |
| 2009/0229062 A1 | 9/2009 | Filby | |
| 2009/0276972 A1 | 11/2009 | Dugan | |
| 2013/0220357 A1 | 8/2013 | Campbell | |
| 2014/0011159 A1 * | 1/2014 | Miller | A46B 3/20 |
| | | | 433/103 |
| 2014/0093836 A1 * | 4/2014 | Wolpo | A61C 17/3481 |
| | | | 433/32 |
| 2014/0272761 A1 * | 9/2014 | Lowe | A61C 17/005 |
| | | | 433/24 |
| 2015/0020323 A1 | 1/2015 | Moll | |
| 2016/0206415 A1 | 7/2016 | Kraft et al. | |

* cited by examiner

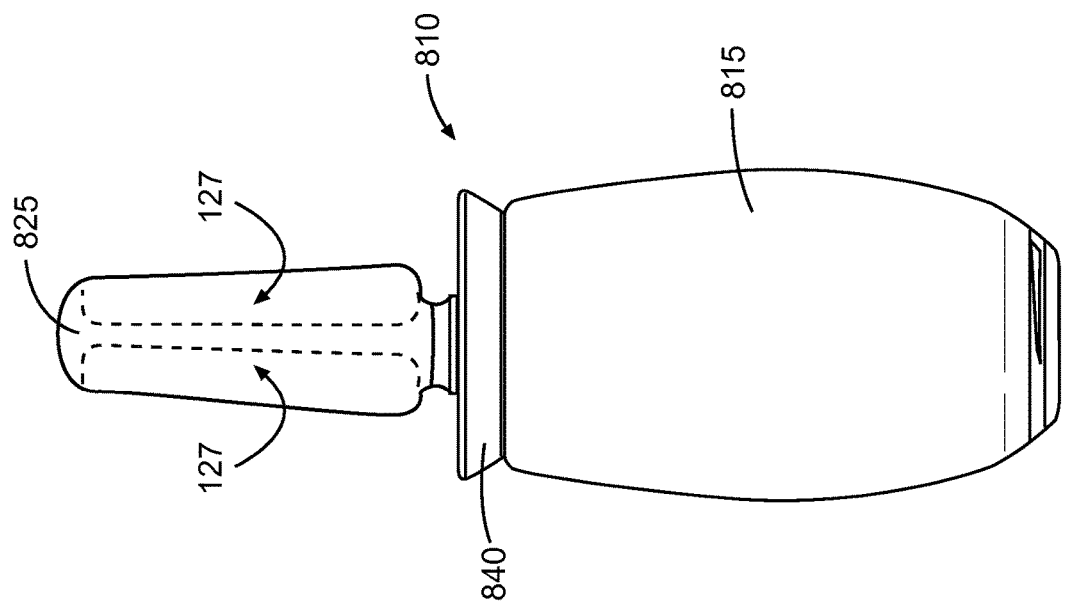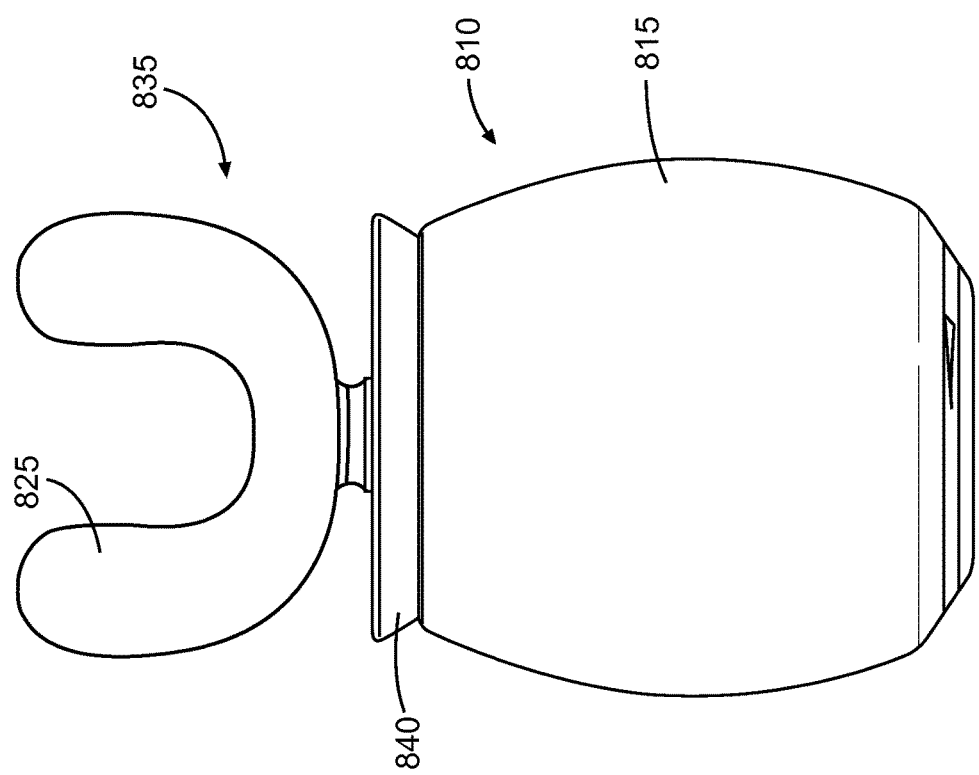

METHODS AND DEVICES FOR PERSONALIZED DENTAL CARE

PRIORITY

This application claims benefit of U.S. Provisional Patent Application No. 62/078,134, filed Nov. 11, 2014 (Nov. 11, 2015 having been a Federal Holiday), which application is incorporated herein by reference in its entirety.

TECHNICAL FIELD

This application relates generally to dental care. Some example embodiments described herein relate, more particular, to methods, systems, and devices for personal dental cleaning. The application also relates to methods for facilitating the production and provision of personalized toothbrush devices to consumers, as well as to the provision of customer services for facilitating personalized dental care.

BACKGROUND

Dental care devices for regular teeth cleaning in an oral health regime are most commonly of the toothbrush-type, in which clustered bristles on a brush head are brought into moving contact with a user's teeth and are moved about the user's mouth for sequential cleaning of different areas of the teeth, guided by the user. The effectiveness of using such toothbrushes and cleaning techniques is, however, strongly dependent on correct brushing technique and patterns, which many users find difficult to master and/or apply consistently.

Most toothbrushes have bristles of varying stiffness, typically being characterized as hard, medium, and soft bristles. The bristles are often arranged on a toothbrush head for engagement with the teeth at a specific orientation, failing which its efficacy may be suboptimal. The Bass Technique, for example, describes an optimal brushing technique in which the toothbrush head is vibrated while in contact with the tooth at an angle of about 45°. In this approach, to and fro movement of the brush head is believed to lead to gum and enamel attrition, and is thus discouraged. It is difficult for many users, particularly for children and the elderly, to brush all tooth surfaces in the mouth optimally, consistently maintaining a brush head angle within the prescribed range.

BRIEF DESCRIPTION OF THE DRAWINGS

Some embodiments are illustrated by way of example and not limitation in the figures of the accompanying drawings in which:

FIG. 7A shows the toothbrush device in an operational mode, while FIG. 7B shows the toothbrush device in a stowed mode.

FIGS. 8A-8D is a series of schematic elevational views of a dental care kit that includes a toothbrush device according to yet a further example embodiment. FIG. 8A shows the kit in a docked, charging mode; FIG. 8B shows, in isolation, a mouthpiece attachment forming part of the dental care kit; FIG. 8C shows the toothbrush device in front view; and FIG. 8D shows the toothbrush device in side view.

OVERVIEW

Figure 1:
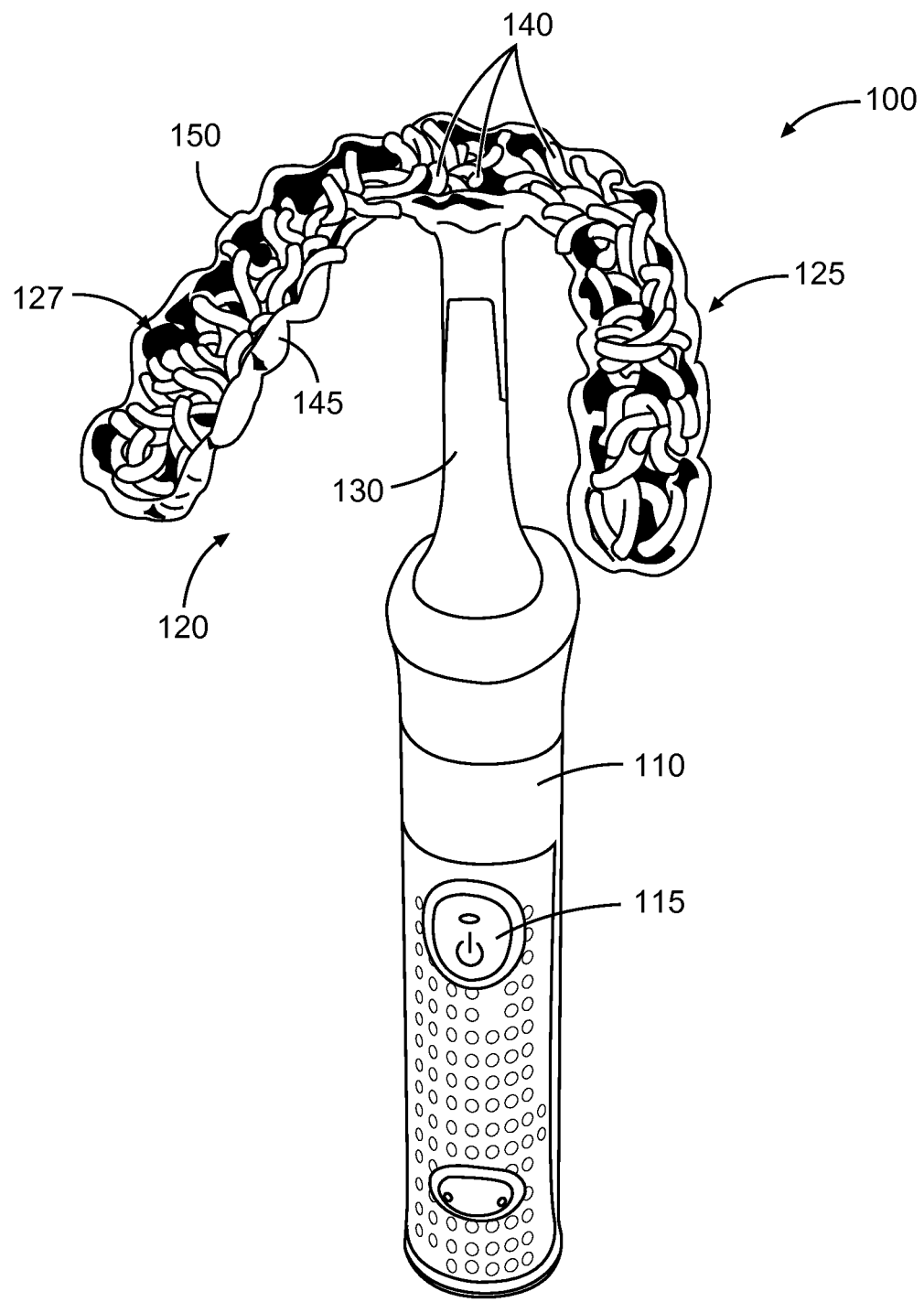
FIG. 1 depicts a schematic three-dimensional view of a toothbrush device in accordance with an example embodiment.

One aspect of the disclosure provides a toothbrush device for use in personal dental care, the device comprising:

a cleaner body that defines a cleaning cavity shaped for receiving a group of teeth of a user; and a powered driving mechanism that is mechanically coupled to the cleaner body and that is configured for imparting driven movement to the cleaner body during reception of the group of teeth in the cleaning cavity, to cause cleaning of the teeth.

Another aspect of the disclosure provides for a method of personal dental care that comprises:

placing a group of teeth of a user in a cleaning cavity provided for the group of teeth by a cleaner body; and while the group of teeth is received in the cleaning cavity, imparting movement to the cleaner body manually or by operation of a motorized mechanism, thereby to cause cleaning of the group of teeth housed in the cleaner body.

In some embodiments, the cleaner body may be personalized for the user. In such cases, the cleaning cavity may be complementary in shape to teeth of a particular user only. The shape of the cleaning cavity may, in other words, be unique.

The cleaning cavity may be shaped for receiving a set of teeth on a particular dental arch of the user. In other words, the cleaning cavity may be shaped for receiving all of the teeth on the user's upper jaw, or all of the teeth on the user's lower jaw. For ease of description, the complete set of teeth on any particular arch is referred to herein as a dental arch set.

The cleaner body may thus be an arch-shaped tray that may be formed based on a dental imprint or 3D-scan of the corresponding dental arch of the associated user. In such cases, the cleaner tray may be a molded component of a polymeric plastics material. The method may include obtaining a tray mold having an imprint of the corresponding dental arch of the particular user, and forming the cleaner tray based on the tray mold.

The device may comprise a complementary pair of cleaner trays, each of which is configured for receiving a respective one of the dental arch sets of the user. Each cleaner tray may in such a case be an attachment configured for removable and replaceable connection to the driving mechanism, to allow for separate use of the cleaner trays on the respective dental arch sets. In other embodiments, the cleaner body may define oppositely outwardly facing cleaning cavities for both arches, so that both dental arches can simultaneously be cleaned by reception in the unified cleaner body.

The cleaning cavity may be shaped such that substantially each tooth received in the cleaning cavity is bilaterally enveloped by opposite sidewalls of the cleaning cavity, by which is meant that at both an outer major face and at an inner major face of each tooth received in the cleaning cavity, the sidewall of the cleaning cavity provided by the cleaner tray extends towards abase of the teeth for at least a majority of the tooth's height. In some embodiments, the sidewalls may extend up to, or over a gumline of the teeth.

The device may comprise cleaning elements on the cleaner body and protruding into the cleaning cavity for contact engagement with the teeth, in use. The cleaning elements may comprise a plurality of filamentary elements, such as bristles or spongelike filaments, projecting into the cleaning cavity from a cavity wall provided by the cleaner tray and defining the cleaning cavity. In some embodiments, the cleaning elements may comprise protrusions or other irregularities on the cavity wall. Such protrusions may be integrally formed with the cleaner tray, so that the cleaner tray and the protrusions are provided by a single component of monolithic construction. In the description that follows, described variations of the arrangement of bristles on the cleaner body will be understood as applying (instead, or in addition) analogously to the arrangement of protrusions on the cavity wall.

In some embodiments, the bristles may have a substantially regular arrangement in the cleaning cavity, so that the number of bristles per unit of surface area on the cavity wall is substantially equal throughout. In some embodiments, however, the bristles may be arranged on the cleaner body to have a greater concentration (i.e., a greater number of bristles per unit of surface area) in some areas of the cavity wall than in others. Greater concentrations of bristles may be provided in areas where more vigorous cleaning is desired. For example, the bristles may be more densely concentrated towards the ends of the dental arch set, corresponding to areas of the mouth most prone to dental decay. The bristles may likewise be arranged to be more densely concentrated at embrasures between adjacent teeth, and/or at the bottom of the teeth.

Instead, or in addition, the bristle arrangement may be such that physical properties of the bristles vary for different areas of the cleaning cavity. Softer or more flexible bristles may, for example, be provided at positions on the cavity wall corresponding or adjacent to the gumline of the user, thereby to lessen the likelihood of irritating the gums. Stiffer or less flexible bristles may likewise be provided at positions corresponding to potential problem areas, such as towards the backmost teeth and/or corresponding to teeth embrasures.

In some embodiments, the arrangement of cleaning elements or bristles on the cleaner tray may be personalized. In other words, the arrangement of bristles (in positioning and/or in physical properties) may be specific and unique to the particular associated user. The method may in such cases include performing or obtaining a dental scan of the respective dental arch sets of the particular user, identifying potential problem areas based on the dental scan, and arranging the bristles in the cleaning cavity based on the identified problem areas. Potential problem areas may be provided with a greater concentration of bristles, and/or with bristles whose physical properties are selected to cause more effective dental cleaning due to powered contact engagement with the teeth.

The driving mechanism may comprise a vibration mechanism for causing driven vibration and/or reciprocation of the cleaner tray. In some instances, the driving mechanism may be configured for causing subsonic oscillation of the cleaner body, i.e. at frequency lower than 20 Hz. The vibration speed of toothbrushes are often measured in movements per minute, where common electric toothbrushes vibrate at a speed of between a few thousand times a minute to approximately 10,000 to 12,000 times per minute. Sonic toothbrushes are so called because the speed or frequency of their vibration (as opposed to the sound of the motor) falls within the average range that is used by people in spoken communication. Voiced speech of a typical adult male will have a fundamental frequency from 85 to 180 Hz (10,200 to 21,000 movements per minute), and that of a typical adult female from 165 to 255 Hz (19,800 to 30,600 movements per minute).

In contrast, ultrasonic toothbrushes work by generating an ultrasonic wave (often by use of an implanted piezo crystal), the frequency of which may begin at 20,000 Hz (2,400,000 movements per minute). The most common frequency for existing ultrasonic toothbrushes, however, is in the region of approximately 1.6 MHz, which translates to 96,000,000 waves or 192,000,000 movements per minute. As described below, the device of this disclosure may in some embodiments be configured primarily for sonic cleaning, may in other embodiments be configured primarily for ultrasonic cleaning, and may in yet further embodiments be configured for cleaning both by sonic and ultrasonic action.

In some embodiments, the vibration mechanism may be configured for causing sonic vibration of the cleaner tray. Cleaning by sonic vibration may rely on sweeping cleaning element movement at a relatively high amplitude (relative to ultrasonic movement, which will be discussed below). Such sonic vibration may be in a frequency range between 20 Hz and 20 kHz, corresponding to 12,000-24,000 oscillations or cycles per minute. Sonic cleaning relies on the sweeping motion of the cleaning elements to clean the teeth by scrubbing engagement therewith. The induced vibration of the cleaner body may be similar or analogous to vibrations generated in conventional brush heads by, for example, toothbrushes available under the SoniCare™ or Oral-B™ trademarks.

Instead, or in addition, the vibration mechanism may be configured for causing ultrasonic vibration of the cleaner tray. Ultrasonic motion is typically at a lower amplitude than is the case for sonic motion. Such ultrasonic vibration may be in the frequency above 20 kHz (i.e., approximately 2.4 million movements per minute), for example being at about 1.6 MHz (i.e., approximately 192 million movements permit). Ultrasonic cleaning operates by the generation of ultrasonic waves that are believed to break bacterial chains making up dental plaque and moving or weakening their attachment to tooth enamel.

Such induced vibration of the cleaner tray 125 also agitates natural cleaning fluids (such as saliva) around the teeth. Because of the fast-moving vibration of the cleaner tray 125, minuscule bubbles are created that push out dental plaque that may be lying just underneath the gum line. These fluids not only push away the plaque, they also dilute and move bacteria-produced acids. This fluid movement and plaque removal can happen without the bristles 140 or other cleaning elements of the cleaner tray 125 even touching the enamel surface. It has been shown with existing toothbrushes having conventional brush heads that this mechanism of cleaning can remove about 76% of plaque in 15 seconds, with the brush held ⅛ of an inch from the teeth.

95% is removed if the space is 0.5 mm or less for 5 seconds and 100% if it's done for 10 seconds.

The induced vibration of the cleaner body of the present disclosure may be similar or analogous to ultrasonic vibrations generated by brush heads of existing toothbrushes available, for example, under the trade name Emmident™.

In some embodiments, induced vibration of the cleaner body may be a combination of ultrasonic and sonic motion. Existing toothbrushes inducing such a combination of ultrasonic and sonic motion in conventional toothbrush heads are available under the Ultreo™ and Megasonex™ trademarks. In embodiments where the device is configured to induce a combination of ultrasonic and sonic oscillation or vibration in the cleaner body, sonic vibration may be provided to produce a sweeping action to remove particles and bacterial remnants previously broken up or weakened by ultrasonic wave action.

The device may therefore be configured for dental cleaning at leas in part by operation of fluid dynamic interaction between the user's teeth and/or gums and liquids contained in the cleaning cavity, in use. As discussed above, such high-speed brushing action can create pressure waves and shear forces in the liquids around the teeth, thereby causing or facilitating teeth cleaning without physically contacting of the teeth with the cleaning elements of the device. Such a fluid dynamic cleaning mechanism may further operate through the generation of minute bubbles that forcefully impinge on the tooth surfaces, thereby to cause dislodgment of plaque and/or other undesired substances from tooth enamel.

In some embodiments, however, the device may be configured for manual manipulation or agitation, thus operating without a motorized driving mechanism. In such embodiments, the device may comprise a handle connected to the cleaner tray and configured for manual control by the user, to insert the cleaner tray into the mouth and perform manual brushing.

DETAILED DESCRIPTION

The following detailed description refers to the accompanying drawings that depict various details of examples selected to show how the disclosed subject matter may be practiced. The discussion addresses various examples of the disclosed subject matter at least partially in reference to these drawings, and describes the depicted embodiments in sufficient detail to enable those skilled in the art to practice the disclosed subject matter. Many other embodiments may be utilized for practicing the disclosed subject matter other than the illustrative examples discussed herein, and structural and operational changes in addition to the alternatives specifically discussed herein may be made without departing from the scope of the disclosed subject matter.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

FIG. 1 is a schematic three-dimensional view of a toothbrush device in the example form of a whole-arch toothbrush 100 in accordance with an example embodiment. The toothbrush 100 comprises a cleaner body in the example form of a cleaner tray 125 for receiving an upper arch set of teeth of a user (i.e., the whole set of teeth on the user's upper jaw), and a housing 110 to which the cleaner tray 125 is connected for driven movement of the cleaner tray 125 during use. As will be described in greater detail below, the housing 110 holds an electric motor and an onboard power source (in the example form of a rechargeable battery, such as a lithium-ion battery) for causing driven oscillation of the cleaner tray 125 when activated by a user-operable press button 115.

The cleaner tray 125 is a generally arch-shaped element defining a cleaning cavity 127 complementary to an upper dental arch set of a particular user. Within the cleaning cavity 127 is located an arrangement of cleaning elements for physical contact engagement with the user's teeth and/or gums when the set of teeth is inserted into the cleaning cavity 127. In this example embodiment, the cleaning elements are provided by a plurality of bristles 140.

The cleaning cavity 127 is generally U-shaped in plan view (corresponding to the U-shape of the corresponding dental arch), and is generally U-shaped in cross-section (corresponding more or less to a lateral width of corresponding teeth). The cleaning cavity 127 thus has an inner sidewall 145 for face-to-face location adjacent and substantially parallel to inwardly facing major faces of the corresponding teeth, and a substantially parallel, opposed outer sidewall 150 for face-to-face location adjacent and substantially parallel to outwardly facing major surfaces of the corresponding teeth. The height of the sidewalls 145, 150 from a base of the cleaning cavity 127 is in this example embodiment somewhat greater than the height of the teeth, so that the sidewalls 145, 150 extend past the gum line of the user, in use.

The cleaning cavity 127 is personalized, being customized for use by a specific associated user only, in that the cleaning cavity 127 has been formed based on a dental imprint of the particular user and is thus substantially complementary in shape to the corresponding arch of the particular user only. Such personalization of the shape of the cleaning cavity 127 promotes proper alignment of the bristles 140 with the respective teeth of the corresponding set, while also ensuring a comfortable fit of the cleaner tray 125 in the user's mouth.

The bristles 140 are arranged on the cleaner tray 125 to project cantilever-fashion into the cleaning cavity. The bristles 140 are in this example embodiment similar or analogous to conventional toothbrush bristles. As will be discussed at greater length later, physical properties and/or distribution density of the bristles 140 vary from one part of the cleaning cavity 127 to another. In other example embodiments, the bristles 140 (or corresponding cleaning elements) may have a substantially regular distribution throughout the cleaning cavity 127.

The cleaner tray 125 is rigidly connected to the housing 110 by an attachment stem 130; enabling transmission of vibratory or oscillating movement from the motor in the housing 110 to the cleaner tray 125. The housing 110 can thus function as a handle by which the toothbrush 100 is held to insert the cleaner tray 125 into the mouth, and to hold the cleaner tray 125 in position during brushing.

The vibration mechanism incorporated in the housing 110 is configured, in this example embodiment, to drive movement of the cleaner tray 125 such as to cause cleaning of the teeth at least in part by ultrasonic action. The toothbrush 100 is thus configured for generating ultrasound in order remove plaque and/or render plaque bacteria harmless. In this example, ultrasonic cleaning action comprises reciprocating or oscillating movement of the cleaner tray 125 at a frequency of about 1.6 MHz. Each movement cycle may comprise a linear to and fro movement, hut may instead comprise circular or elliptical movement.

In some embodiments, the toothbrush 100 is, instead or in addition, configured for sonic cleaning, with the vibration mechanism being configured for producing at least some vibration of the cleaner tray in the audible range. The frequency range of such driven movement may be in the range of 200 to 400 Hz, translating to 12,000-24,000 movement cycles per minute.

In this example embodiment, the toothbrush 100 provides for optional user-controlled switching between sonic and ultrasonic cleaning, for example by operation of the press button 115. Control circuitry of the toothbrush 100 is in this instance configured to allow cycling through different modes based on repeated pressing of the button 115, the different modes comprising an ultrasonic mode, a sonic mode, and a switched off mode. In other embodiments, the toothbrush 100 may be preprogrammed to automatically perform a cleaning cycle that comprises both ultrasonic and sonic vibrations produced in a predefined sequence. In such a case, for example, a few seconds of ultrasonic vibration may serve to generate ultrasonic waves to break up bacterial chains that make up the dental plaque and remove or weaken their methods of attachment to the tooth surface.

Fluid dynamic action caused by impelled movement of the cleaner tray 125 is found to disrupt plaque at traditionally hard-to-reach areas, such as between teeth and below the gum line. Cleaning by use of the toothbrush 100 thus serves not only to clean the major outer faces of the teeth, but additionally effectively performs a flossing operation by causing removal of foreign material from spaces between adjacent teeth. In some embodiments, the fluid dynamic cleaning effects operate at a distance of up to 4 mm from the contact points between the bristles 140 and the teeth. Thereafter, sonic vibration may automatically be produced for physically cleaning and removing the weakened or loosened materials. The vibration mechanism is in some embodiments configured such that the amplitudes of the sonic movement will typically be larger than that of movements produced during ultrasonic cleaning.

In operation, the user may use the assembled toothbrush 100 as illustrated in FIG. 1 to clean the teeth of the upper arch, and may thereafter (or before) use an analogous attachment 120B (see FIG. 3) for cleaning the teeth of the lower arch. Each one of these operations comprises gripping the toothbrush 100 by the housing 110; inserting the cleaner tray 125 into the mouth; biting down lightly on the cleaner tray 125, so that the teeth are snugly inserted in the cleaning cavity 127; and then activating the driven sonic and/or ultrasonic vibration of the cleaning cavity 127 by operation of the push button 115. It has been found that effective dental cleaning is achieved within a brushing period of as little as about 5 seconds for each arch.

In some embodiments, the user may hold the cleaner tray 125 substantially stationary in the mouth during driven vibration thereof. In other embodiments, however, the cleaner tray 125 may be moved around in the mouth during vibration. In one example, the cleaning process for each arch comprises a five second sequence in which the user moves the cleaner tray 125:

(a) forward for one second,
(b) backward for one second,
(c) down for one second,
(d) up for one second, and
(e) side-to-side for one second.

It has been found that such a scrubbing motion is highly effective, due partly to the high number of brush strokes per minute generated simultaneously across the entire dental arch.

In some embodiments, the toothbrush 100 may be used without any toothpaste or specific cleaning agent. In other embodiments, conventional abrasive toothpaste may be applied to the teeth or to the cleaning cavity 127 prior to use. In some embodiments, however, the toothbrush 100 may be used with a dental paste or cleaning substance constituted specifically for use with the cleaner tray 125. Such a dental paste may be configured for promoting fluid dynamic cleaning actions, as described herein, when applied to the teeth or to the cleaning cavity 127 prior to reception of the teeth in the cleaner tray 125.

It will be appreciated that, due to the generally U-shaped cross-sectional profile of the cleaning cavity 127, the cleaning paste will be retained within the cleaning cavity 127 during cleaning. The cleaning paste may in some embodiments be substantially free of abrasives, thereby to preserve tooth enamel. Instead, or in addition, the cleaning paste may have a viscosity a higher than that of conventional toothpastes. In one embodiment, the cleaning paste may be a very high viscosity fluid, the viscosity being selected to promote transmission and therefore effectiveness of sonic and/or ultrasonic waves induced by trade vibration. The cleaning paste may in some embodiments be an all-natural product.

Figure 2:
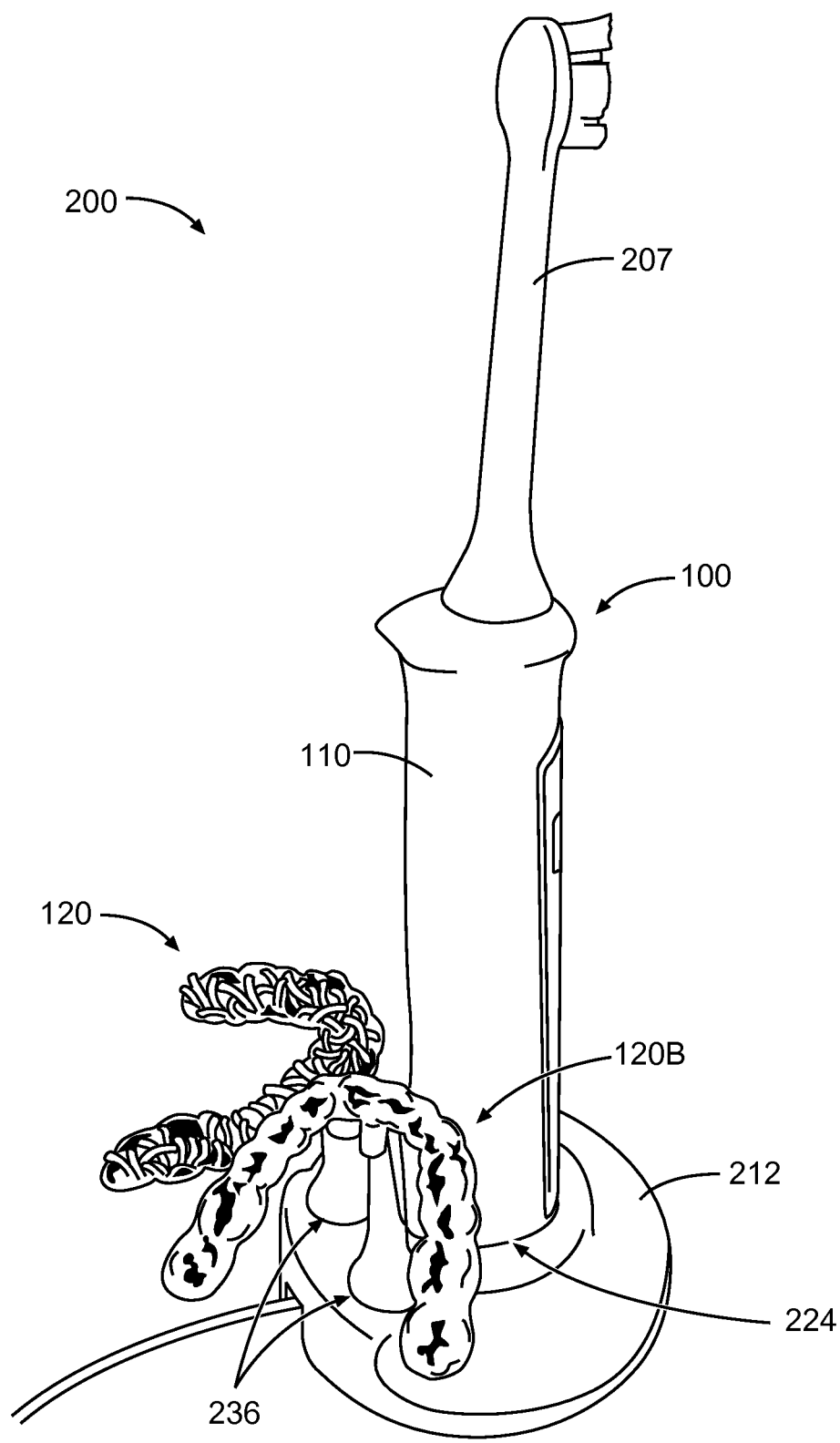
FIG. 2 depicts a schematic three-dimensional view of a dental cleaning kit in accordance with an example embodiment, the kit including a device consistent with the example embodiment of FIG. 1.

In FIG. 2, numeral 200 generally indicates a toothbrush kit 200 that includes the handle housing 110, a charging base or stand 212, and three attachments which are configured for removable and replaceable connection to the housing 110. The attachments in this example embodiment consists of the upper arch attachment 120 described previously, a similar lower arch attachment 120B which is connected to its attachment stem 130 in an inverted orientation relative to the upper arch attachment 120, and a conventional toothbrush attachment 207, which is shown as being connected to the housing 110. Note that the attachments 120, 120B, each comprises a respective cleaner tray 125 to which the corresponding attachment stem 130 is rigidly connected. Removability and replaceability of the attachments 120 are thus achieved by this engageable coupling between the stem 130 and the housing 110. In some instances, the stem 130 may be rigidly connected to a rigid framework of the cleaner tray 120 (i.e. being of one-piece instruction therewith), the cleaner tray 120 in such cases being a molded component supported by its internal framework and through which vibratory movement is transferred from the stem 130.

The stand provides a charging socket 224 for receiving and supporting the housing 110 in an upright orientation while electrically connecting the battery inside the housing 110 to a mains power supply for recharging the battery. The stand 212 further provides two separate seats 236 for holding the unused attachments 120 in an upright orientation in which the respective cleaner trays 125 are clear of a support surface.

Figure 3:
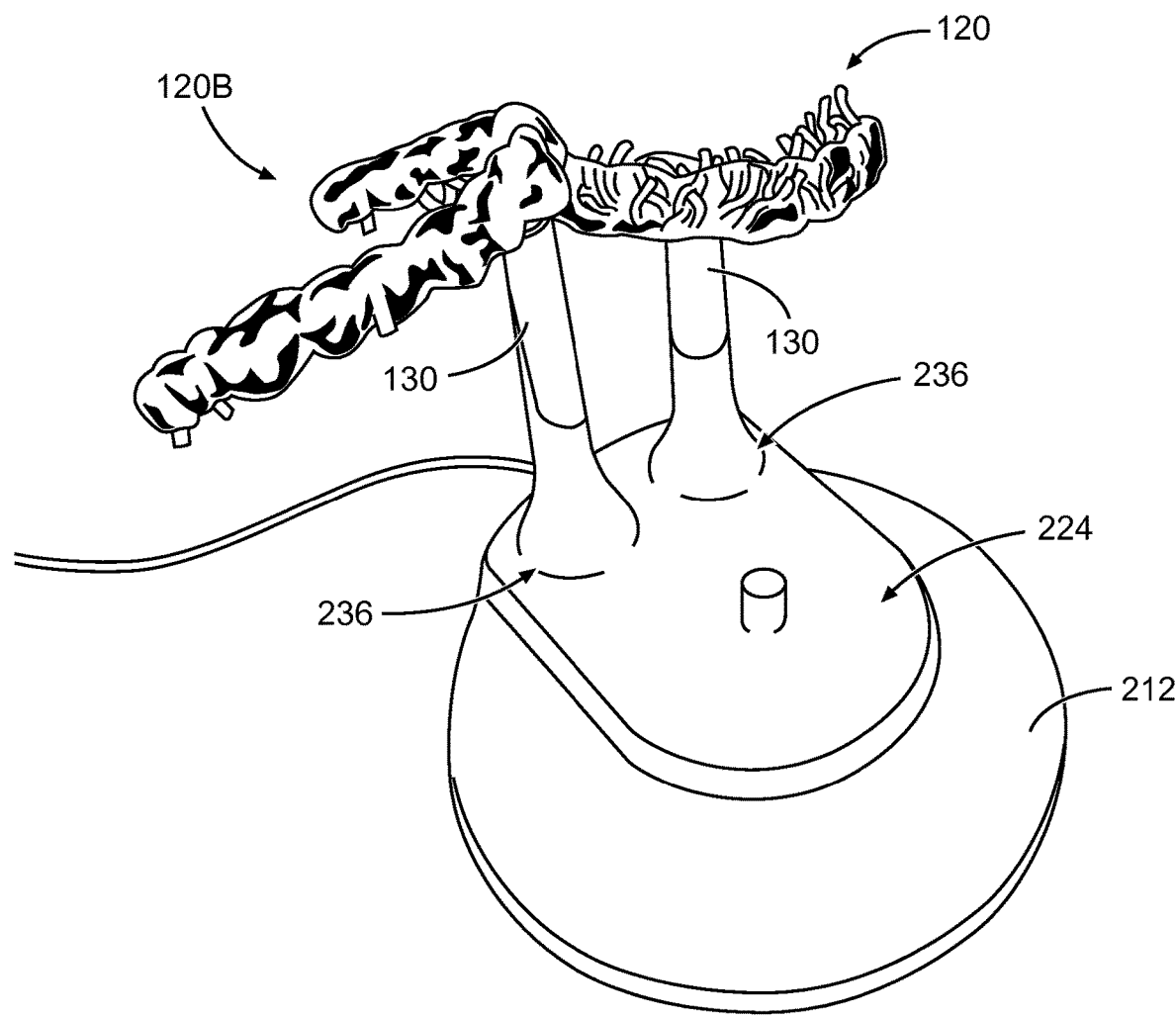
FIG. 3 depicts a schematic view, on an enlarged scale, of part of the dental cleaning kit of FIG. 2, in accordance with an example embodiment.

FIG. 3 shows a more detailed view of the stand 212 holding the upper arch attachment 120 and the lower arch attachment 120B in stored positions for selective use. Some embodiments of the kit 200 may further include an accessory for cleaning the cleaner tray(s) 125 by removal of foreign material from the cleaning cavity 127. The cleaning accessory may be configured for ultrasonic cleaning of the trays.

Figure 4:
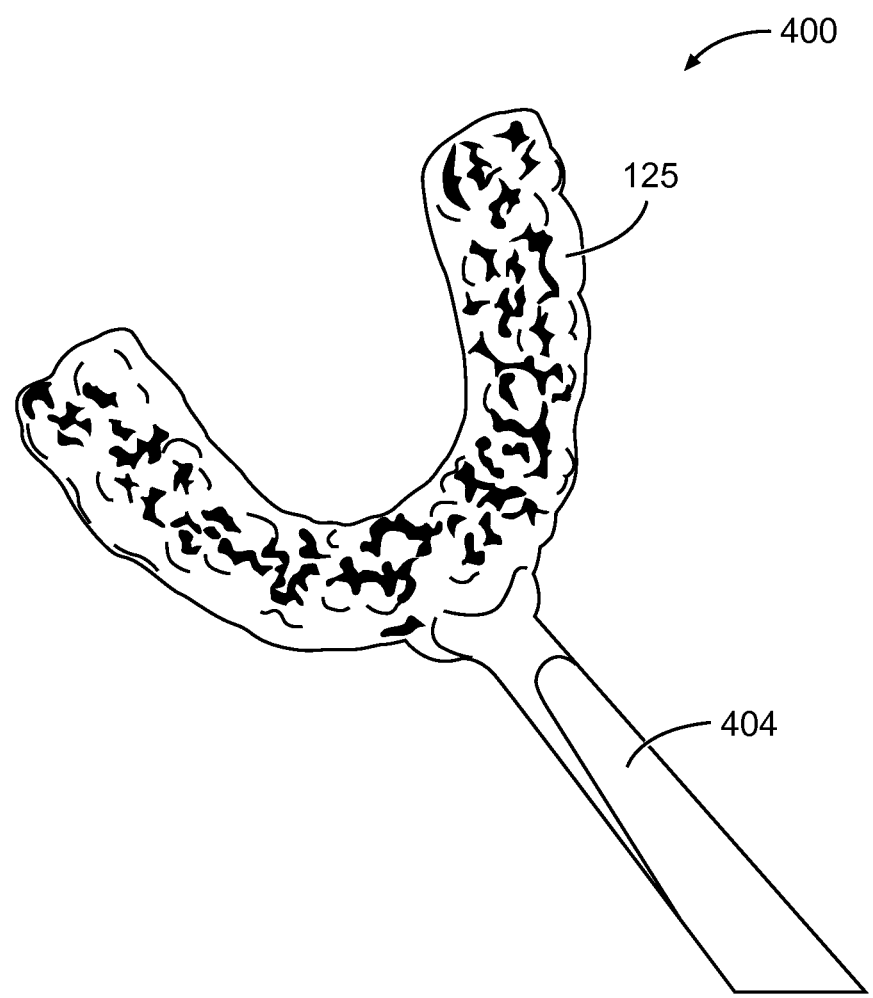
FIG. 4 depicts a partial three-dimensional view of a personalized manual toothbrush device in accordance with an example embodiment.
Figure 5:
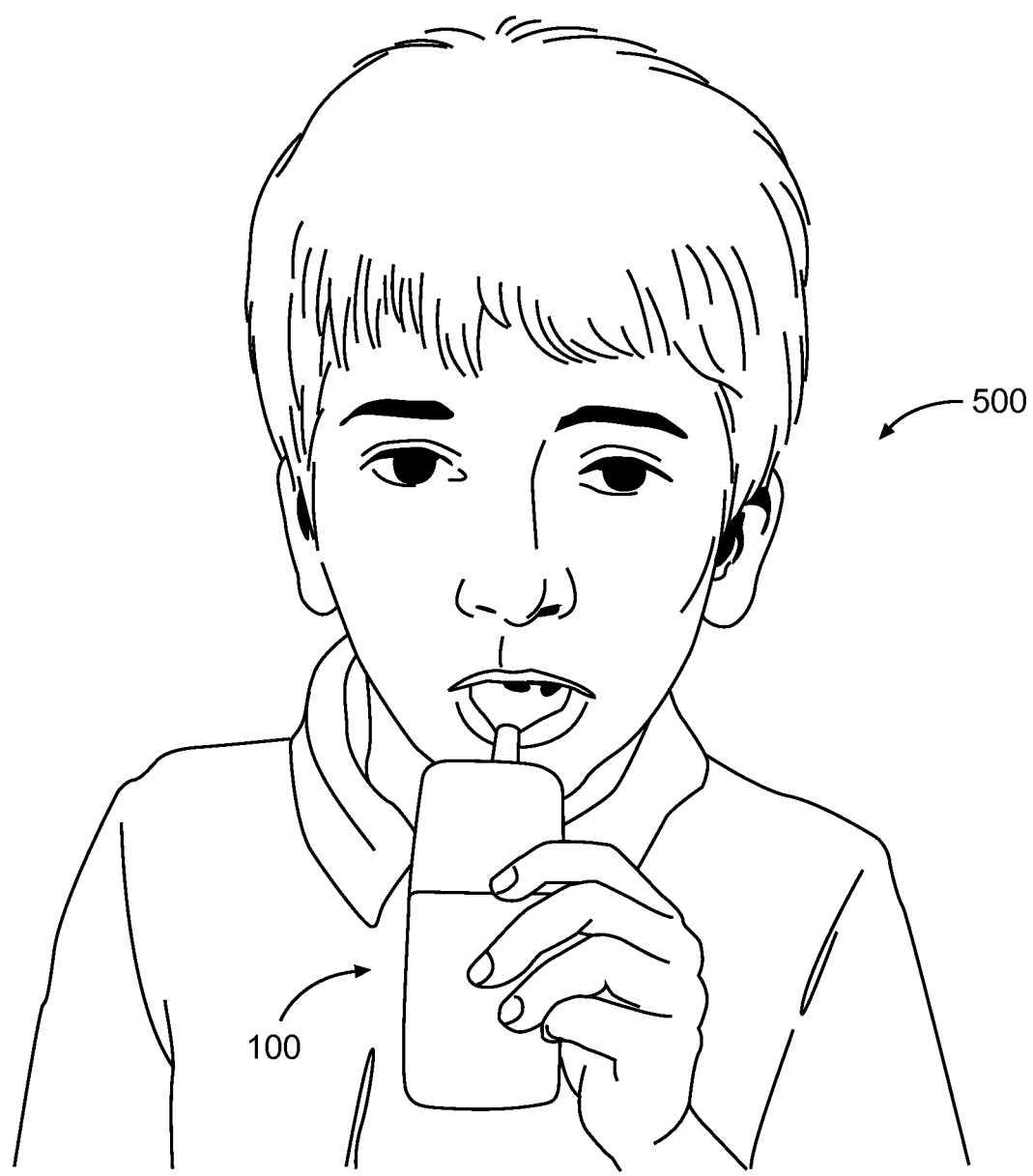
FIG. 5 is a schematic three-dimensional view of use of a toothbrush device by a user for dental cleaning, in accordance with an example embodiment.

In some embodiments, a dental cleaning device in accordance with the disclosure may be provided and used for dental cleaning without driven agitation of the cleaner tray 125. A partial view of such a manual toothbrush 400 is shown in FIG. 4 and comprises a cleaner tray 125 such as that described above attached to a rigid elongated handle 404, which functions analogously to conventional manual toothbrush handles. As can be noted in the foregoing drawings, as well as in FIG. 5 (which shows dental cleaning use of another embodiment of a toothbrush 100 according to the disclosure by a user 500) the handle 404 of the manual toothbrush 400 is attached to the cleaner tray 125 at or adjacent the apex of the arch defined by the cleaner tray 125. The same applies to attachment of the respective attachment stems 130 to the cleaner trays 125 of the embodiments of FIGS. 1-3, and 5.

Such placement of the handle 404 (or, in other embodiments, the attachment stem 130) causes the toothbrush 400 to be aligned more or less with a midline of the user's face, when the cleaner tray 125 receives the corresponding set of teeth. In other embodiments, the handle 404 or attachment stem 130 may be somewhat offset from the axis of symmetry of the cleaner tray 125.

For manual dental cleaning by use of the toothbrush 400, the cleaner tray 125 is inserted into the mouth, being manipulated via the handle 404, and the user bites down lightly on the cleaner tray 125 to ensure a complementary mating fit between the corresponding set of teeth and the cleaning cavity 127. Thereafter, the cleaner tray is moved backwards and forwards via the handle 404, to cause sweeping movements of the bristles 140 over teeth and gums. Thereafter, the opposite set of teeth may be similarly cleaned using a separate device (or attachment 120) for that arch. Note that the pair of attachments shown in FIGS. 2 and 3 may be configured for either manual or automated use, so that the user can grip the respective attachments 120 in turn by their respective attachment stem 130, to clean the respective arches in turn.

In the example embodiments described above, each cleaner tray forms a distinct unit for cleaning a separate one of the user's opposite dental arches. In other embodiments, however, a unified cleaner body may be provided that defines respective cleaning cavities 127 for both the upper and the lower arch. The user will in such cases simultaneously insert both the lower arch and the upper arch into the respective cleaning cavities provided by the single cleaner body, so that subsequent vibration, oscillation, or manual agitation of the cleaner body causes simultaneous cleaning action of both the upper arch and the lower arch.

This disclosure also extends to a method of facilitating personal dental health for a user by providing the user with a customized dental cleaning device or toothbrush 100 as described above. The personalized cleaner tray 125 may be formed based at least in part on a dental scan performed at a facility such as a dentist's office. In such cases, the dentist may perform a 3-D scan, taking a digital impression of the teeth, embrasures (i.e., the space between teeth for flossing), and gums. These impressions are translated to customized and personalized brushing trays for both upper and lower arches.

The 3-D scanning operation may accurately calculate each tooth's shape, curvature, and anatomy. The 3-D scan may also record the interdental spaces (e.g., the flossing areas or embrasure areas of the respective teeth). The cleaning cavity 127 may then be formed based on a somewhat enlarged model, or with an offset spacing relative to the original imprint, to provide space for cleaning elements between the cavity wall and the teeth. In this example embodiment, the scanned imprint is enlarged by an offset of 1-3 mm, depending on the individual patient's preference.

The offset spaces are then covered with bristles, which may be angled to precisely clean every surface of the tooth. While, in some embodiments, the bristles may be arranged to universally project more or less perpendicularly from the cavity wall, the bristles may in other embodiments have varied angles of incidence relative to the cavity wall, with their angles being determined at least in part for optimal cleaning efficiency. In some example embodiments, bristle arrangement at respective embrasures may be configured to promote bristle access to the respective embrasures, for example by providing bristles angled for optimal or improved brushing action in the embrasures. As described elsewhere, the interdental areas may in some cases be cleaned by wave action.

A customer service thus provided to facilitate personalized dental care may include providing the user with the option of choosing a particular cleaner tray 125 and bristle arrangement from a plurality of different available options, based on user preference. For example, a user with a gag may choose a smaller offset, so that the body of the cleaner tray can be smaller and fit more tightly on their teeth. Someone who, on the other hand, prefers greater leeway to move the brush within the mouth, to add mechanical brushing along with sonic and/or ultrasonic brushing, may select a larger offset. Fabrication of the cleaner trays may in some embodiments comprise injection of prefabricated sheets of a polymeric plastics material into the mold.

Figure 6:
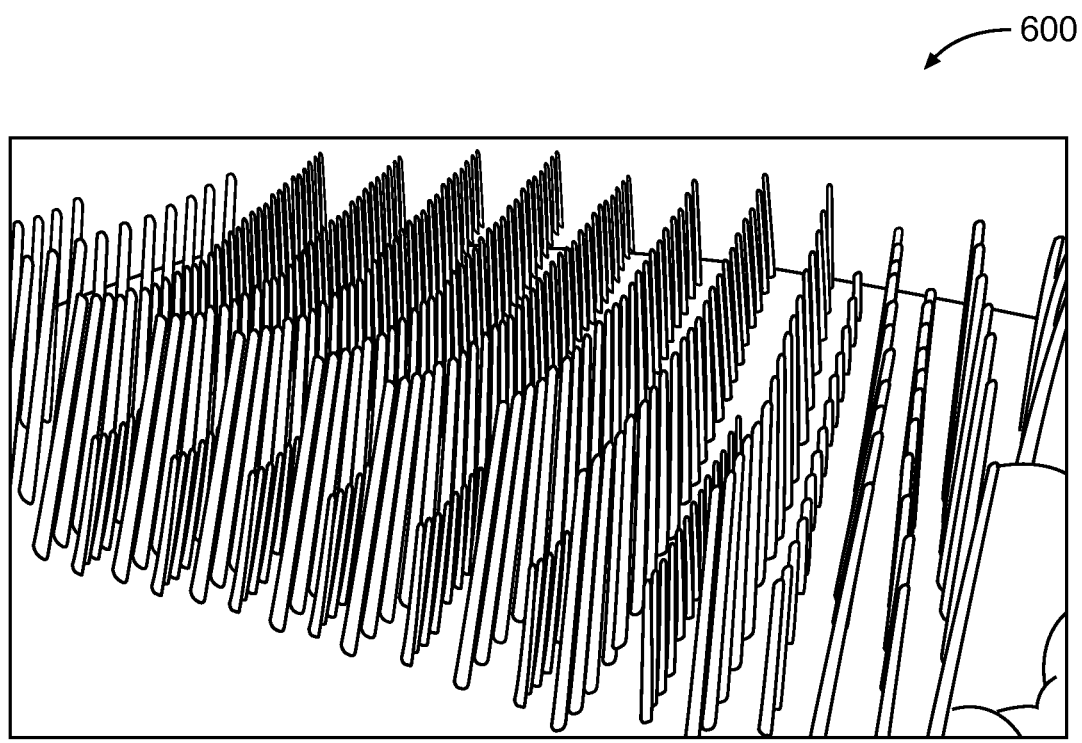
FIG. 6 is a schematic three-dimensional view of a monolithically formed bristled sheet blank for use in forming a cleaner tray in accordance with an example embodiment, the bristles of the blank being configured for forming cleaning elements of the eventual cleaner tray.

The prefabricated sheets may have bristle-like filaments injected into the sheet or integrally formed therewith, to provide the fibers or cleaning elements in the cleaning cavity 127. An example embodiment of the prefabricated bristled sheet 600 is provided in FIG. 6. In some embodiments, manufacture of the cleaner tray 125 may comprise a 3-D printing operation to the prefabricated bristled sheets based on the above-described 3-D scan.

In other embodiments or instances, the cleaner tray 125 may instead be formed based on a user-provided imprint. Users who, for example, do not have access to a dental scanning facility, or who wish to limit costs, may therefore opt to form the dental imprint at home. Such embodiments may comprise delivering, upon request, to the user a blank mold for use in forming of the cleaner tray 125, e.g. by mail or courier service. The user can then form a dental imprint in the mold by biting into it, whereafter the mold bearing the dental imprint is returned. The mold is then used at a central manufacturing facility to produce the customized cleaning tray(s) 125 in a manner similar or analogous to that described above with reference to the 3-D scan. The customized cleaner tray 125 is then returned to the user (e.g., by mail, courier service, or personal pick up) for personal use. In some embodiments, manufacture of the cleaner tray 125 may be by 3-D printing.

In one embodiment, the method may comprise continually sending to the user, on a regular or periodic basis, replacement cleaner trays 125, based on the original mold or 3-D scan. A regular period for such cleaner tray replacement may be based on the rate of deterioration, in use, of the cleaner tray 125. Replacement cleaner trays 125 may, for example, be automatically sent to the user at three-month intervals. The method may further include, on an ongoing basis, obtaining new dental imprints or 3-D scans for the user at spaced intervals, and producing subsequent cleaner trays 125 based on the most recent 3-D scan or dental imprint.

As mentioned previously with respect to the example embodiment of FIGS. 1-3, the arrangement and/or configuration of cleaning elements (e.g., the bristles 140) in the cleaner trays 125 can in some embodiments be varied for different positions in the cleaning cavity 127, e.g, by varied positioning and/or distribution density of the bristle 140. This variation may be generic, applying universally to all users, but may in some instances be personalized based on individual user needs.

Generic variations may include providing higher bristle densities or stiffness in areas that are universally or typically of concern. Thus, the bristles 140 may be arranged in the cleaning cavity 127 such that the bristles are arranged more densely and/or are individually stiffer towards the ends of the arch (corresponding to the back teeth), while softer and/or less densely bristled arrangements may be provided adjacent the gum line.

Individualized variations in cleaning element positioning and/or properties may be based on identified areas of concern or weaknesses in the corresponding dental arch of the user. Areas of the particular user's teeth that are identified as actual or potential problem areas (e.g., suffering decay or early indicators of decay, or identified as particularly difficult to clean areas) may be have an increased bristle stiffness or concentration on the corresponding areas of the cleaning cavity 127. A method of facilitating personal dental cleaning consistent with the disclosure can in such cases include performing a dental scan of the user, identifying actual or potential problem areas based on the dental scan, and customizing the spatial arrangement and/or distribution of different types of cleaning elements (or cleaning elements with different physical properties) in the cleaning cavity 127 based on the identified problem areas.

In some embodiments, the cleaning elements may be integrally formed with the material that provides a body of the cleaner tray 125. In such cases, the cleaner tray 125 may thus be of monolithic construction, with the cleaning elements being provided by protrusions or other cleaning formations formed on the interior surface of the cleaning cavity 127. Manufacture of the cleaner tray 125 may in such cases comprise forming the cleaner tray in a molding operation from a single mold, without prior positioning of the cleaning elements in a mold cavity or afterwards attaching the cleaning elements to the molded body of the cleaner tray 125.

In other embodiments, the mold may be formed with connection formations for connection of individual cleaning elements. In one example embodiment, for example, the body of the cleaner tray 125 may be formed with an arrangement of connection sockets to which individual cleaning elements of polymeric plastics material are connectable by snap-fit engagement. Some embodiments, a set of relatively soft, sponge-like polymeric plastics cleaning elements may be connected socket-spigot fashion to a molded base or body of a cleaner tray. The cleaning elements may in such a case be tightly packed together in a grid, no that closely spaced, slightly concave end faces of the cleaning elements together form an engagement surface for contact engagement with the teeth and for promoting fluid dynamic teeth cleaning action.

In some embodiments, the cleaning elements may be arranged on the cleaner tray 125 such that they do not touch the tooth enamel during cleaning. It will be appreciated that such an arrangement may be provided for instances where the toothbrush 100 is configured for ultrasonic cleaning, with the cleaning elements being configured for promoting ultrasonic fluid dynamic cleaning, without physical scrubbing of the teeth and/or gums.

Figure 7B:
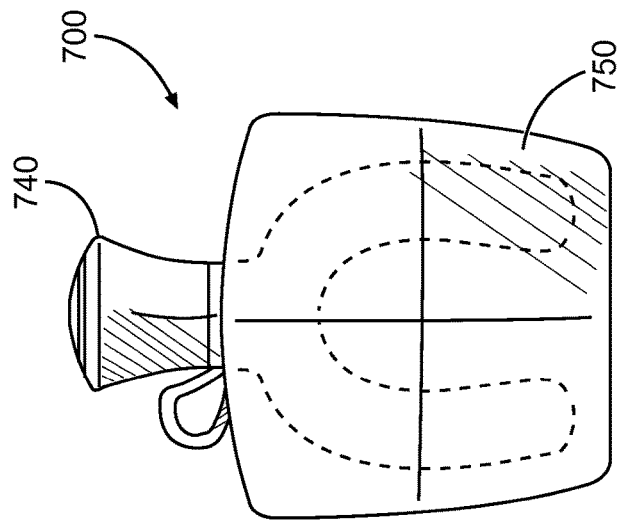
FIGS. 7A and 7B are schematic three-dimensional views of a toothbrush device according to another example embodiment.
Figure 7A:
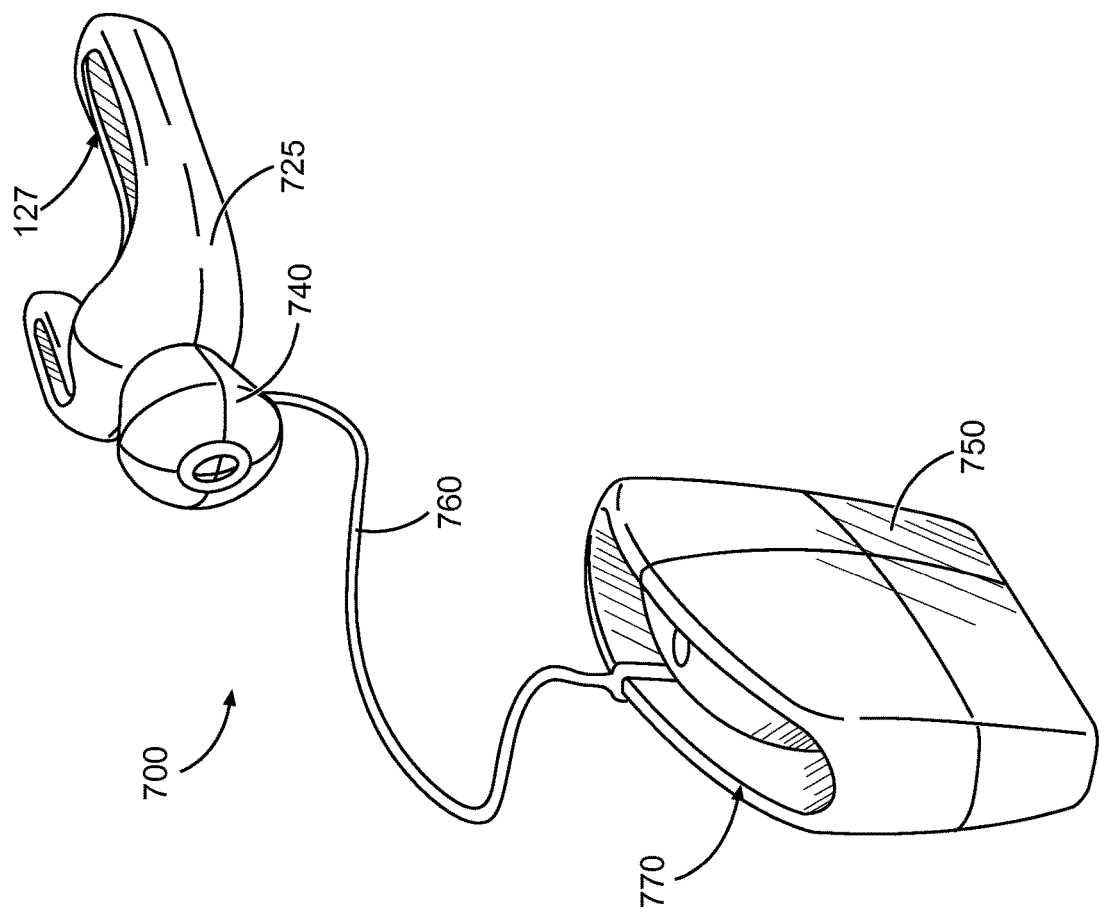

Turning now to FIGS. 7A and 7B, therein are shown another example embodiment of a toothbrush device 700 consistent with the disclosure. Functioning of a cleaner tray 725 forming part of the device 700 is substantially similar to that described previously with reference to the embodiment of FIGS. 1-3. The vibration mechanism is, however, in the embodiment of FIGS. 7A and 7B carried in a knob-like handle 740 attached to the cleaner tray 725 at its apex. A power source for the vibration mechanism is carried in a base unit 750, the vibration mechanism being connected to the power source via an electrical power cord 760 connecting the handle 740 to the base unit 750.

The base unit 750 further defines a complementary docking cavity 770 for the cleaner tray 725. When the cleaner tray 725 is received in the docking cavity 770 (see FIG. 7B) the cleaning cavity 127 of the cleaner tray 725 is located wholly within the docking cavity 770, being hidden from view and from exposure to the atmosphere. The device 700 in such a stowed mode forms a compact portable unit in which the cleaning tray 725 is sealingly located within the base unit 750, with the handle 740 projecting upwards from the base unit 750 for easy access by the user.

The base unit 750 in this example embodiment is configured not merely for holding the cleaner tray 725 such that it is protected from exposure between brushings, but is additionally configured to actively sanitize the cleaner tray 725 during docking. In this example embodiment, the base unit 750 is provided with an ultra-violet (UV) cleaning arrangement that irradiates the cleaner tray 725 in general, and the cleaning cavity 127 in particular, with sanitizing UV light when the cleaner tray 725 is inserted in the docking cavity 770. In other embodiments, the base unit 750 can be configured to effect cleaning of the cleaner tray 725 during docking by causing exposure of the cleaning cavity 127 to a sanitizing liquid. In such embodiments, the cleaner tray 127 may form a liquid-tight seal with the base unit 750, to contain the sanitizing liquid safely and to permit use of the device 700 is a travel accessory.

FIGS. 8A-8D show a further example embodiment of a dental care kit 800. A toothbrush device 810 forming part of the kit 800 functions in a manner similar or analogous to that described with reference to FIGS. 1-3, with selected differences and functionality and configuration described below.

The toothbrush device 810 has a housing 815 that houses a vibration mechanism in the example form of an electric motor, together with a coupled rechargeable electric battery. As shown in FIG. 8A, the housing 815 has a base that is receivable in a complementary mating charging socket defined by a docking station 820. When the toothbrush device 810 is thus docked on the docking station 820, an electrical connection is automatically formed between the rechargeable battery and mains power to which the docking station 820 is connected, thereby recharging the battery.

Figure 8B:
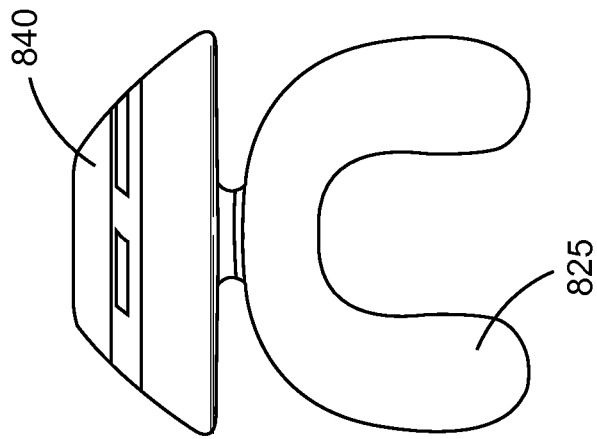
Figure 8A:
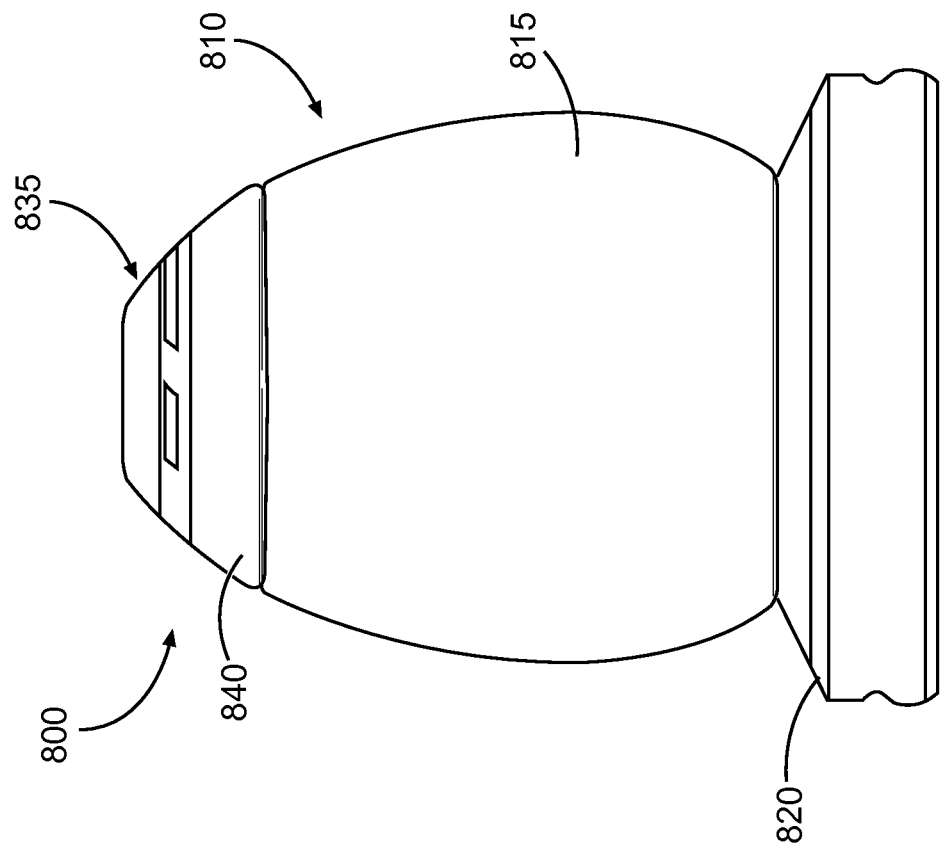

The toothbrush device 810 in this example includes a reversible mouthpiece attachment 835 (see FIG. 8B) that is connectable to an upper end of the housing 810 in either a storage mode (FIG. 8A) or in an operational mode (FIGS. 8C and 8D). In the storage mode shown in FIG. 8A, a cleaner body 825 forming part of the attachment 835 is located within the interior of the housing 810, so that the cleaner body 825 is hidden from view and is not exposed to the atmosphere.

A handle 840 of the attachment 810 in this configuration serves as a lid for the housing 810. As was described with reference to the example embodiment of FIGS. 7A and 7B, the housing 810 provides a sanitizing mechanism (e.g., a UV cleaning system) that serves to sanitize the cleaner body 825 when the device 810 is in the storage mode. In the storage mode, the toothbrush device 810 forms a self-contained, sealed unit suitable for use as a travel accessory.

The cleaner body 825 in this example embodiment is configured for simultaneously cleaning both dental arches of a user. As shown in broken lines in FIG. 8D, the cleaner body 825 thus defines a pair of oppositely outwardly facing cleaning cavities 127 such as that described previously, each being complementary in shape to a respective dental arch of the specific user for which the device 800 is customized. In use, the user can therefore insert the cleaner body 825 between their dental arches, bite down onto the cleaner body 825 to receive each dental arch in its corresponding cavity 127, and can then clean both arches at the same time by activating the vibration mechanism. Note that the cleaning cavities 127 in this example embodiment has no filamentary cleaning elements for contact engagement with the teeth, but is instead configured to effect dental cleaning primarily through operation of fluid dynamics.

In the operational mode (FIG. 8C), however, the orientation of the attachment 835 is reversed, so that the handle 840 is firmly connected to an upper end of the housing 810, the cleaner body 825 projecting away from the housing 810. Note that the selectively detachable coupling of the attachment 835 to the housing 810 is such as to transfer operational or oscillatory forces from the motor in the housing 810 to the cleaner body 825.

It is a benefit of the described embodiments that it provides for personal dental cleaning that is both quicker and more effective than is the case with conventional toothbrushes. It is expected that the whole mouth can be cleaned in as little as 5-10 seconds, while achieving more consistent and thorough cleaning results. This is in part because all surfaces of the teeth of the corresponding dental arch are brushed simultaneously, based on the vibratory or reciprocating movement that is imparted to the cleaner tray 125 and that all of the bristles therefore having common.

It is also beneficial that all parts of the dental arch can consistently be accessed with equal ease and effectiveness by the cleaner tray 125, independent of user skill or dexterity. Many users are not able, for example, to reach rearward facing surfaces behind the molars and areas where the tongue covers the teeth, or fail to do so consistently. These and other problems associated with user-controlled brushing patterns are exacerbated for children and the elderly, who often do not have sufficient manual dexterity for implementing correct brushing techniques using conventional toothbrushes. These problems are greatly reduced by the described methods and devices.

Yet a further benefit of some of the described embodiments is that flossing is effected simultaneously for all the embrasures in the relevant arch, and simultaneously with cleaning of other tooth and gum surfaces (e.g., by operation of fluid action induced by tray vibration within particular frequency ranges, as described), and without needing to pass a filament or other cleaning element sequentially through the embrasures of different teeth, as is the case with conventional flossing. Again, simultaneous whole-arch dental flossing without forceful insertion of dental floss or toothpicks into the embrasures promotes enamel and gum health by preventing abrasive contact with these surfaces.

A further benefit is that the arrangement of cleaning elements in the cleaning cavity 127 can be configured such as to avoid or prevent deleterious effect from bad brushing habits. Conventional tooth brushing can, for example, be detrimental to the health of enamel and gums, particularly by abrasion that can be caused by overly brushing. Most users are also not able to maintain the correct angle of conventional toothbrushes heads.

As mentioned, the cleaner tray 125 can in some embodiments be formed such that there is no bristle contact with the gums during brushing. In some embodiments, as described previously, dental cleaning by use of the device is effected without abrasive contact with tooth enamel, thereby protecting enamel from wear caused by brushing and scraping.

Moreover, customization of the cleaner tray 125 provides for user-specific cleaning mechanics, providing the ability to accommodate dental conditions unique to any particular user. A further benefit is that, for some of the described embodiments, the benefits of flossing are achieved without the need of a floss string that physically passes into spaces between adjacent teeth.

It will be seen that one aspect the above-describe example embodiments includes a toothbrush device which includes a cleaner body that defines a cleaning cavity shaped for receiving a group of teeth of a user. The device may include a powered driving mechanism that is mechanically coupled to the cleaner body and that is configured for imparting driven movement to the cleaner body during reception of the group of teeth in the cleaning cavity, to cause cleaning of the group of teeth.

In some embodiments, the cleaner body is personalized for a specific user, the cleaning cavity corresponding substantially to a dental imprint of the corresponding group of teeth. In some embodiments, the cleaner body is configured for receiving a particular dental arch set of the user, being a set of teeth on a corresponding dental arch of the user. In some embodiments, the cleaner body defines a pair of oppositely outwardly facing cleaning cavities. In such cases, each of the cleaning cavities may be shaped and configured for receiving a respective dental arch set of the user, to allow simultaneous reception of all of the user's teeth by the cleaner body.

In some embodiments, the cleaner body is removably and replaceably coupled to the powered driving mechanism.

In some embodiments, the cleaning cavity is shaped such as substantially to envelop between opposing side walls of the cleaning cavity each tooth received in the cleaning cavity. In some embodiments, the opposing side walls that define the cleaning cavity are shaped and configured such as to extend over respective gum lines of the group of teeth, when the group of teeth are fully received in the cleaning cavity.

In some embodiments, such a toothbrush device may further include cleaning elements carried by the cleaner body and protruding into the cleaning cavity for contact engagement with teeth received in the game cavity. In some embodiments, the cleaning elements may include elongate filamentary elements protruding into the cleaning cavity. In some embodiments, the cleaning elements may include protrusions on a cavity wall defining the cleaning cavity. In some embodiments, the protrusions may be of monolithic construction with the cleaner body.

In some embodiments, arrangement and configuration of the cleaning elements are non-uniform for different areas of a cavity wall that defines the cleaning cavity. In some embodiments, the cleaning elements may be arranged and configured for relatively more vigorous cleaning action in one or more focus areas. In some embodiments, the one or more focus areas may include areas corresponding to embrasures between adjacent teeth. Instead, or in addition, the one or more focus areas may include areas corresponding to ends of a dental arch.

In some embodiments, variation in arrangement and configuration of the cleaning elements may include higher density concentration of the cleaning elements in the one or more focus areas. Instead, or in addition, variation in arrangement and configuration of the cleaning elements may include differences between, on the one hand, one or more physical properties of individual cleaning elements in the one or more focus areas, and, on the other hand, corresponding physical properties of individual cleaning elements in other areas.

In some embodiments, the arrangement and configuration of the cleaning elements are customized for a specific user, such that at least one of the one or more focus areas corresponds in location to an identified dental problem area of the corresponding specific user.

In some embodiments, the powered driving mechanism may include a vibration mechanism for causing driven vibration of the cleaner body. In some embodiments, the vibration mechanism is configured for causing sonic and/or subsonic oscillation of the cleaner body. Instead, or in addition, the vibration mechanism may be configured for causing ultrasonic vibration of the cleaner body. In some embodiments, the vibration mechanism is configured to enable dental cleaning via the cleaner body using both sonic and ultrasonic cleaning.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A toothbrush device, comprising:
a cleaner body that is personalized for a particular user based on a dental model of the particular user's teeth and that defines a cleaning cavity shaped for receiving the particular user's teeth, wherein the cleaning cavity defined by the cleaner body is enlarged relative to a size of the particular user's teeth in the dental model;
a plurality of cleaning elements, integrally formed with the cleaner body, to contact the particular user's teeth during application of the toothbrush device, wherein the plurality of cleaning elements is composed of a same material as the cleaner body, the plurality of cleaning elements being configured such that:
  i) a spatial arrangement of the plurality of cleaning elements is personalized for the particular user based on the dental model of the particular user's teeth,
  ii) a distribution density of the plurality of cleaning elements is personalized for the particular user based on the dental model of the particular user's teeth, and
  iii) lengths of the plurality of cleaning elements are personalized for the particular user based on the dental model of the particular user's teeth; and
a powered driving mechanism that is mechanically coupled to the cleaner body and that is configured for imparting vibrational movement to the cleaner body during reception of the particular user's teeth in the cleaning cavity to cause cleaning of the teeth by the plurality of cleaning elements.

2. The toothbrush device of claim 1, wherein the cleaner body is configured for receiving a dental arch set of the particular user, the dental arch set being a set of teeth on a corresponding dental arch of the particular user.

3. The toothbrush device of claim 2, wherein the cleaner body defines a pair of oppositely outwardly facing cleaning cavities, each of the cleaning cavities being shaped and configured for receiving a respective dental arch set of the particular user, to allow simultaneous reception of all of the particular user's teeth by the cleaner body.

4. The toothbrush device of claim 1, wherein the cleaning cavity is defined between opposing side walls that are shaped and configured such as to extend over a gum line of the particular user's teeth, when the particular user's teeth are fully received in the cleaning cavity.

5. The toothbrush device of claim 1, wherein the driving mechanism is configured for causing ultrasonic vibration of the cleaner body.

6. The toothbrush device of claim 1, wherein the driving mechanism is configured to enable dental cleaning via the cleaner body using both sonic and ultrasonic cleaning.

7. The toothbrush device of claim 1, wherein the same material is a polymeric plastics material.

8. The toothbrush device of claim 1, wherein the cleaner body is removably coupled to the driving mechanism.

9. The toothbrush device of claim 1, wherein imparting the vibrational movement comprises imparting vibrations of varying frequencies in a predefined sequence.

10. The toothbrush device of claim 9, wherein the varying frequencies comprise both ultrasonic and sonic frequencies.

11. The toothbrush device of claim 9, wherein imparting the vibrational movement further comprises imparting vibrations of varying amplitudes in a predefined sequence.

12. The toothbrush device of claim 1, wherein the plurality of cleaning elements comprises protrusions of the cleaner body.

13. The toothbrush device of claim 1, wherein the plurality of cleaning elements comprises a subset of cleaning elements configured to clean the particular user's gums.

14. The toothbrush device of claim 1, wherein the plurality of cleaning elements is configured not to contact the particular user's gums.

15. The toothbrush device of claim 1, wherein the plurality of cleaning elements comprises a subset of cleaning elements configured to clean interdental areas.

16. The toothbrush device of claim 1, further comprising a rigid framework, wherein the cleaner body is molded onto the rigid framework.

17. The toothbrush device of claim 1, wherein the spatial arrangement, distribution density, and lengths of the plurality of cleaning elements are selected, at least in part, to alleviate dental problems of the particular user identified from the dental model of the particular user's teeth.

18. The toothbrush device of claim 17, wherein the dental problems of the particular user identified from the dental model of the particular user's teeth include one or more teeth suffering decay.

19. The toothbrush device of claim 1, wherein the plurality of cleaning elements includes a plurality of different types of cleaning elements, the different types of cleaning elements having differing physical properties; and
wherein a distribution of the different types of cleaning elements is based on one or more dental problems of the particular user identified from the dental model of the particular user's teeth.

* * * * *